United States Patent
Anol et al.

(10) Patent No.: US 11,790,654 B2
(45) Date of Patent: Oct. 17, 2023

(54) DERIVED COMPETITION

(71) Applicant: Genius Sports SS, LLC, Los Angeles, CA (US)

(72) Inventors: Alvin Anol, La Puente, CA (US); Cameron Korb, Venice, CA (US); Matthew Goldberg, Los Angeles, CA (US); Matthew Redfield, Santa Monica, CA (US)

(73) Assignee: GENIUS SPORTS SS, LLC, Los Angeles, CA (US)

( * ) Notice: Subject to any disclaimer, the term of this patent is extended or adjusted under 35 U.S.C. 154(b) by 283 days.

(21) Appl. No.: 17/218,014

(22) Filed: Mar. 30, 2021

(65) Prior Publication Data

US 2021/0303865 A1    Sep. 30, 2021

Related U.S. Application Data

(60) Provisional application No. 63/002,908, filed on Mar. 31, 2020.

(51) Int. Cl.
| | |
|---|---|
| *G06V 10/764* | (2022.01) |
| *G06V 20/40* | (2022.01) |
| *G06N 5/025* | (2023.01) |
| *A63B 71/06* | (2006.01) |
| *G06V 20/52* | (2022.01) |

(52) U.S. Cl.
CPC .......... *G06V 20/42* (2022.01); *A63B 71/0605* (2013.01); *G06N 5/025* (2013.01); *G06V 20/47* (2022.01); *G06V 20/53* (2022.01); *G06V 2201/07* (2022.01)

(58) Field of Classification Search
CPC ........ G06V 20/42; G06V 20/47; G06V 20/53; G06V 20/40; G06V 2201/07; G06V 10/765; A63B 71/0605; G06N 5/025; G06N 20/00
See application file for complete search history.

(56) References Cited

U.S. PATENT DOCUMENTS

| | | | |
|---|---|---|---|
| 10,363,488 B1 * | 7/2019 | Willette | .................. A63F 13/63 |
| 10,460,177 B2 | 10/2019 | Chan et al. | |
| 2016/0247537 A1 * | 8/2016 | Ricciardi | ............... G06V 20/42 |
| 2017/0238055 A1 * | 8/2017 | Chang | ................ H04N 21/4662 |
| | | | 725/19 |
| 2018/0301169 A1 * | 10/2018 | Ricciardi | ............. G11B 27/036 |
| 2019/0354765 A1 * | 11/2019 | Chan | .................. H04N 21/2187 |
| 2022/0319173 A1 * | 10/2022 | Ricciardi | ......... H04N 21/41407 |

* cited by examiner

*Primary Examiner* — Carol Wang
(74) *Attorney, Agent, or Firm* — EIP US LLP

(57) ABSTRACT

Video feeds may be analyzed to identify matchups between participants. The matchups may be used to derive a competition, context, statistics, and the like. A result of the derived competition may depend, at least in part, on an ordering and outcomes of a set of matchup events. The derived competition may be presented as a collection of video clips corresponding to the set of matchup events, related commentary, and/or related statistics.

12 Claims, 6 Drawing Sheets

DERIVED COMPETITION

CROSS-REFERENCE TO RELATED APPLICATIONS

The present application claims the benefit of U.S. Patent Application Ser. No. 63/002,908, filed Mar. 31, 2020, and entitled "DERIVED COMPETITION" (SECS-0011-P01).

The content of the foregoing application is hereby incorporated by reference in its entirety for all purposes.

Reference is also made to U.S. Pat. No. 10,460,177, issued Oct. 29, 2019, and entitled "METHODS AND SYSTEMS OF SPATIOTEMPORAL PATTERN RECOGNITION FOR VIDEO CONTENT DEVELOPMENT" which is hereby incorporated by reference in its entirety.

BACKGROUND

Field of the Invention

The methods and systems of derived competition described herein may relate to generating derived competition among participants of real-world events.

Description of the Related Art

In many existing competitions, such as sports leagues or tournaments, the winner is determined by the outcomes of a sequence of games or matches between pairs of participants. Within each game, there may be a number of occurrences of different types of shorter-duration events, such as dunks, isolations, blocks, and steals in a basketball game that may themselves be viewed as a tournament or other competition between and among participants. At present, these shorter-duration events are only viewed as components of the larger tournament.

SUMMARY

In embodiments, methods and systems of derived competition may include deriving a competition from event video, context, statistics, and the like of an original competition (e.g., a real-world competition between athletes and the like), where a result of the derived competition depends, at least in part on an ordering and outcomes of a set of matchup events found in the original competition. The derived competition may be presented as a collection of video clips corresponding to the set of matchup events, related commentary, and/or related statistics. The video clips may optionally be augmented with graphics and/or statistics relating to the matchup events and/or the derived competition.

By viewing certain types of events within games as mini matchups between individual players (or more generally subsets of players), subsidiary competitions may be derived from an existing competition. For instance, a subsidiary competition between individual basketball players based on dunks may be derived from the outcomes of events consisting of a dunk attempt involving an offensive and defensive player. The two players involved in such an event are considered to be matched up in the derived competition. The outcome of the event, e.g., whether or not the dunk attempt results in a made basket, determines the winner and loser of that matchup.

A derived competition may be defined by specifying a relevant event type (or types), e.g., dunk attempts involving an offensive and defensive player, as well as a set of rules to determine the subset of events of that type from the original competition that are included in the derived competition.

The subset of matchup events included in the derived competition may be determined by a set of rules specifying how the winner and/or loser of a matchup event is eligible to be matched up against a subsequent opponent. Various different types of rules may be used to define different types of derived competitions. In an embodiment, the first occurrence of a relevant event type in the original competition may be considered as the first matchup event in the derived competition. The winner of that matchup is considered to be the defending belt holder. The next occurrence of an event of that type involving the belt holder becomes the next matchup event in the derived competition. The belt holder either retains or loses the belt depending on the outcome of that next matchup event and so on, with the belt holder at the end of the competition being declared the winner of the derived competition. In other embodiments, group and/or elimination stages may be defined, where matchups involving a larger set of players may be included earlier in the derived competition.

The examples in this section are merely representative of some possible embodiments but do not reflect all possible embodiments, combinations of elements, or inventions disclosed in this application. In an example, a method may include accessing a set of stored video feeds and receiving first rules for detecting matchups. In some cases, first rules may include spatiotemporal pattern algorithms that use a machine learning system to facilitate detecting a set of matchup events in the set of stored video feeds. The method may further include receiving second rules for detecting participants in the set of stored video feeds, processing, with the first rules and the second rules, frames of the set of stored video feeds to identify at least one matchup event and at least one participant associated with each matchup event, determining, in the identified at least one matchup event, event features, and tabulating the determined event features. In some embodiments, tabulating may further include determining a number of matchup events that may include a first participant and determining outcomes of the matchup events that include the first participant. The method may further include generating, based on the tabulated event features, a recommendation for monitoring video feeds for matchup events that include a first participant. In some embodiments, the method may also include receiving a selection for monitoring and analyzing a second set of video feeds for video relating to one or more matchups that include the first participant. In one example, the method may further include generating an alert for a user in response to detecting a matchup that includes the first participant. In one example, the method may also include generating a video summary of the matchups that include the selected first participant by extracting portions of video content from the set of stored video feeds. In some cases, the first rules may include a trained machine learning model. In embodiments, the method may include receiving weighting for the participants, and determining ranking of the matchup events based on the weighting and tabulation of the determined features. In one example, determining features may include determining at least one of: a type of event, a duration of the event, an outcome of the event, or a crowd reaction to the event. In one example, the method may further include determining categories of matchup events based on the tabulation. In some cases, the second rules may include rules for jersey number detection and jersey number detection may include video frame by frame jersey number detection comprising classifying a plurality of windows in each frame as one of containing a number and as numberless. In one example, the classified plurality of windows in each frame containing the number may be stitched together to form a temporal jersey number track.

In an example, a method may include at least one of designating a participant or receiving an indication of the participant for at least one matchup in a derived competition, associating a participant identifier with the participant, detecting events in a set of video feeds using spatiotemporal pattern algorithms that use a machine learning system to facilitate detecting events that include the participant associated with the participant identifier, extracting portions of the set of video feeds as a set that correspond to the detected events that include the participant, and refining the set of extracted video feed portions based on at least one derived competition rule that indicates a type of event for a matchup in the derived competition. The method may further include ordering the refined set of extracted video feed portions based on the at least one derived competition rule that indicates a required order of events, selecting an event from the ordered set of portions based on a matchup event selection criteria associated with the at least one derived competition rule, and determining a winner of the matchup for the selected event, wherein the winner is based on an outcome of the selected event that is determined from use of the machine learning system that is constructed to identify event outcomes and associate the event outcomes with the participant in the event. In an example, the machine learning system may use jersey number detection for identifying participants and the jersey number detection may include video frame by frame jersey number detection comprising classifying a plurality of windows in each frame as one of containing a number and as numberless. In some cases, the classified plurality of windows in each frame containing the number may be stitched together to form a temporal jersey number track. In an example, the method may further include determining event features from the selected event, wherein the features include at least one of: a duration of the event, or a crowd reaction to the event and assigning a category to the event based on the determined event features. In some embodiments, the method may further include identifying a second event, occurring after the selected event, that includes the winner of the matchup for the selected event and/or identifying a second event, occurring before the selected event, that includes the winner of the matchup for the selected event.

In an example, a method may include receiving an indication of an event type for at least one matchup in a derived competition, detecting events in a set of video feeds using spatiotemporal pattern algorithms that use a machine learning system to facilitate detecting events of the indicated event type, extracting portions of the set of video feeds as a set that corresponds to the detected events of the indicated event type, and refining the set of extracted video feed portions based on at least one derived competition rule for a matchup in the derived competition. The method may further include ordering the refined set of extracted video feed portions based on at least one derived competition rule that indicates a required order of events for the indicated event type, selecting an event from the ordered set of portions based on a matchup event selection criteria associated with the at least one derived competition rule, and determining event features of the matchup for the selected event. In some cases, the event features may be determined from use of the machine learning system. In an example, determining the event features may include determining at least one of: an outcome of the event, a duration of the event, participants in the event, or a crowd reaction to the event.

BRIEF DESCRIPTION OF THE FIGURES

The following detailed description of certain embodiments may be understood by reference to the following figures.

DETAILED DESCRIPTION

Figure 1:
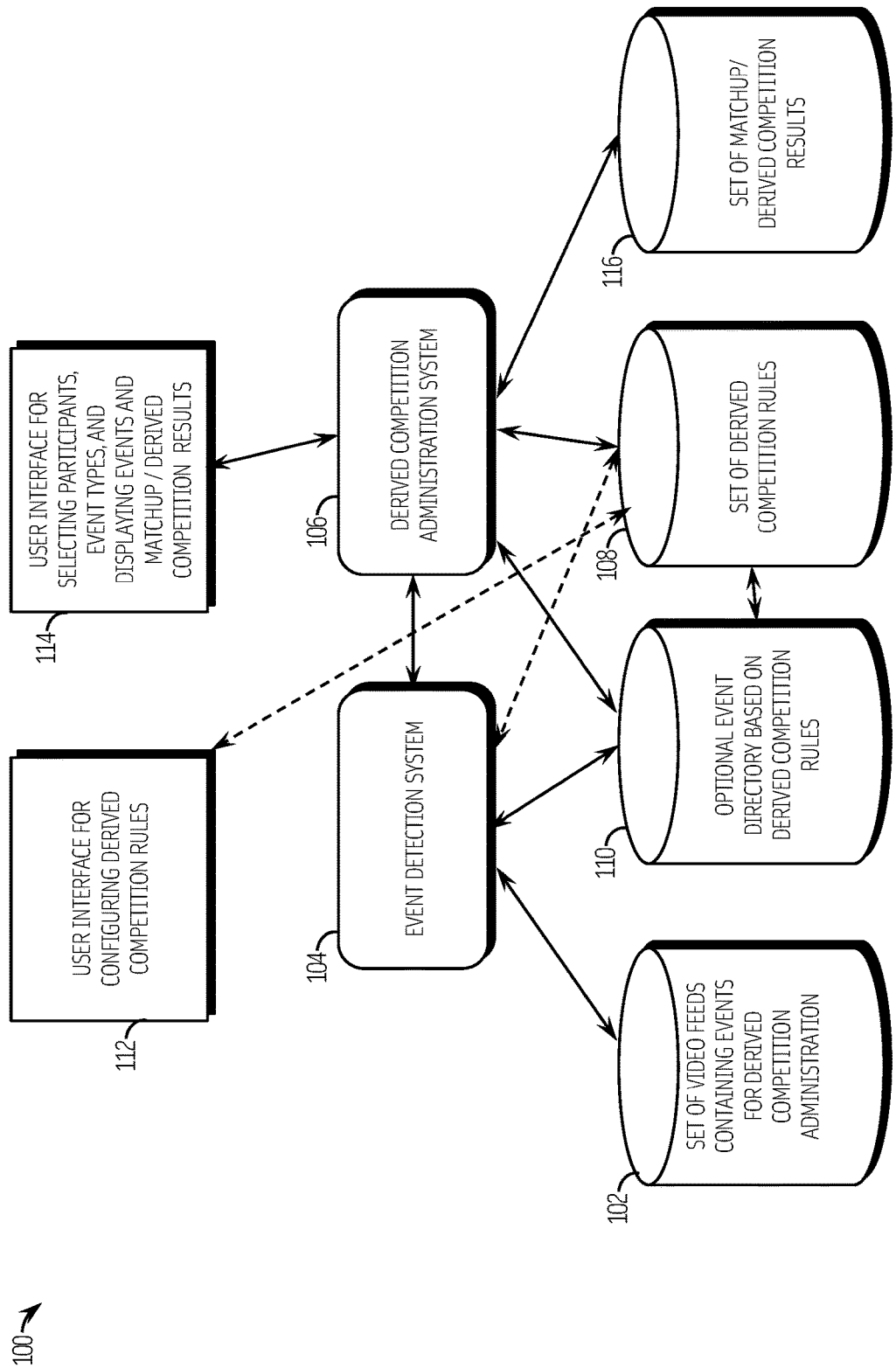
FIG. 1 illustrates a system diagram of a derived competition embodiment.

Methods and systems of machine learning-based systems may facilitate generating derived competitions among participants of real-world competitions that may be captured on a video feed and the like. A derived competition may be defined by specifying one or more relevant video event types that may correspond to video event types detectable by the spatiotemporal pattern recognition methods and systems described in U.S. Pat. No. 10,460,177, which is hereby incorporated by reference in its entirety. Derived competition event types may include direct competition between players of a sporting event, such as dunk attempts involving an offensive and defensive and the like. U.S. Pat. No. 10,460,177 references a range of event types, and a range of event attributes that may be associated with an event type and the like. Any of these or other event types may be specified when constructing a derived competition. In embodiments, one or more event types that may be detected with the embodiment described in U.S. Pat. No. 10,460,177 for use with machine learning, and the like may be presented to a user and the like in an interface of a derived competition user interface. While sports competition type events are referenced herein and used in examples herein, other event types that may be suitable for use with derived competition are contemplated herein. Examples of other types of events may include natural events (e.g., plants growing), man-made events (e.g., blowing out candles on a birthday cake), and the like. These other examples are merely included to clarify that the methods and systems for derived competition are not necessarily limited to specific sports competitions.

A derived competition may further be defined by a set of competition rules that may provide guidance to determine, among other things, a subset of video events of the specified event type from a video feed of an original competition that is to be included in an instance of a derived competition. Derived competition rules may further facilitate determining which participant(s) in a derived competition is(are) winners and which are losers. Derived competition rules may further facilitate determining how participants of individual matchups of a derived competition are selected, a sequence of video events of the specified type to include in the derived competition, and the like.

Methods and systems of derived competition may include constructing one or more matchups between participants (competitors), such as by identifying each of the participants for a given matchup. In an example, constructing a derived competition for dunking in basketball may include identifying two players who appear in video feeds of real-world competitions. Identifying players may include providing data that facilitates detecting the players in the real-world video feeds, such as the players' teams, the players' jersey number, and the like. While a user interface may facilitate identifying players in a variety of way (e.g., showing a lineup of players, providing a list of players, facilitating a user selecting a player in the playback of one of the video feeds, and the like), the interface may provide data that may be useful for machine-based player detection, such as jersey number, or other indicia that may be known to the machine-based player detection system (e.g., an index into a player database, and the like). The methods and systems for spatiotemporal pattern recognition and the like described in U.S. Pat. No. 10,460,177 may be used in such a machine-based player detection system may receive player identifiers, such as a jersey number that could be provided to a jersey number tracking facility described. In addition to or in place of a user selection of one or more competitors for a derived competition, in embodiments, a player identifier may be computer-generated, such as for random participant selection for matchups and the like. In embodiments, the competition rules may be used to determine one or more players or competitors for a derived competition and the like.

With a derived competition specified to include participants (or at least a pool of candidate participants and the like) and a set of rules for administering the derived competition, an automated system may employ various techniques for identifying and gathering (or at least cross-referencing) excerpts of video feeds that meet the derived competition requirements (e.g., that have the specified players and meet the event selection criteria of the rules). In an example, a derived competition may identify two players, A and B; the rules for this derived competition may identify a criteria (e.g., a basketball season, a playoff series, only playoff games, only home games for player A, only when the team of player B has a lead over the team of player A, and the like) from which events of the competition event type are to be excerpted. The event type for the derived competition may be designated as an attempted dunk of one player over the other. Such an event type may be further refined to player A attempting to dunk over player B and the like. In embodiments, rules for a derived competition may facilitate identifying players for a derived competition and for a specific matchup within the derived competition, as well as a conditional sequence of players that are to be matched up against each other. Such a rule-based conditional sequence may include adjusting player selection, player sequence, event selection, and the like conditionally, such as based on results of matchups of a derived competition and the like. Conditions that may impact a sequence may further include status, conditions, results, and the like of related derived competitions and the like.

Identification and analysis of derived competitions and matchups may be used for various purposes, including entertainment purposes (such as for generating entertaining video clips), determining rights for future real-world competitions (e.g., home-court advantage of an all-star game), compensation of participants, promotional purposes (e.g., promoting the participants, a sport, a sports league, products and/or services related to the sport, such as a type of shoe worn by a participant, and the like), educational purposes (e.g., comparing technique of the participants for performing a sports act), and/or performance analysis of athletes. In embodiments, methods and systems described herein may enable athlete comparison and analysis that may not be possible using traditional methods. Methods and systems described herein provide for flexible criteria for derived and other competitions allowing comparison and tracking of athletes for criteria that may not be compared or tracked using other means.

For example, derived competition and matchups may be identified in video feeds of running competitions such as trail running, marathons, or ultra-running. Unlike races on a running track, which has a consistent and uniform surface around the track, long-distance running involves a constantly changing course, with each section of the course being different. Traditional comparison of runners (such as mile marker split times) which are well suited for traditional track races may miss interesting and important aspects of a race and performance of some athletes since mile markers and splits may not align with features of course (such as uphill or downhill sections, sections with headwinds, rocky features, etc.). In embodiments, analysis of comparison on runners using derived competition and matchups from video clips may allow for a comparison of performance (speed, acceleration, total time, maximum speed) between runners for virtually any feature in the course regardless of the presence of timing markers or timing gates. In embodiments, analysis of comparison on runners using derived competition and matchups from video clips may allow comparison of runners over any number of features or events in the race even if the runners are not next to each other.

For example, a matchup event may be defined as performance (time to run) in a technical rocky section that has at least a 5% uphill gradient and a length of 100 meters. The matchup may be defined between two or more top-ranked runners in the race. Systems and methods described herein may analyze the video feed of a trail running race to identify sections of the race that meet the matchup criteria. Video frames may be analyzed to identify the running surface by detecting shapes of rocks, the height of rocks, textures, and the like. Participants may be identified by their race numbers, names, sponsors, facial features, gait, and the like. The winner of the matchup may be identified by the relative gap between the runners in the analyzed section of the trail (a widening or narrowing gap may indicate if the leading runner is faster or slower, respectively). In some cases, the winner of the matchup may be identified by timing a participant for the section using the frame rate of the video data. In some cases, the matchup may be identified and analyzed using only the video feeds. In some cases, the matchup may be identified and analyzed using the video feeds and other data such as GPS data from the runners, course data, and the like. A series of sections in a race or multiple races that meet the matchup criteria may comprise a derived competition. A winner of the derived competition, in this example, may be determined based on one or more criteria such as total time gained/lost overall the course sections or percentage of matchups for which a participant gained time on the opponent.

It should be noted that the matchups and derived competition in the above example would not be possible with other means. Analysis using GPS data, for example, cannot be used to derive or determine specific terrain data such as how rocky or sandy the trail surface is.

Video feed events that correlate to the derived competition criteria may be detected using various pattern detection techniques and the like as described in U.S. Pat. No. 10,460,177. Nonetheless, however, a relevant set of extracted events are determined, the derived competition rules may be applied to administer the competition based on the set of events. In an embodiment, the events may be tagged with time/date of occurrence so that a first occurrence of the set of extracted events may be considered as the first matchup event in the derived competition. Because this first matchup event is an actual event, a winner of the matchup may be determined, such as automatically by a pattern detection system that can detect a result of an attempted dunk, such as the dunk being blocked, the dunk missing the basket, or the dunk being successful. This basic process may be reused with different participant(s), different event types, different event(s), and the like. In an example, a winner of a first matchup may then be matched up with a different participant that replaces the loser of the first matchup, and the process of event extraction, ordering, and outcome determination may be repeated. In embodiments, a series of matchups may be configured so that a winner of each matchup is matched up with another competitor selected from a candidate competitor set, which may be preconfigured in a competition order and the like. Further in embodiments, the derived competition rules may, for example, require that an event for each subsequent matchup occur chronologically after an event for a prior matchup. In this way, matchups throughout a basketball season of games may be constructed as a derived competition. Other approaches for determining which event applies to which matchup are possible. One such example of event-to-matchup correlation may require that each subsequent event must be a specific event number in a set of events organized chronologically. Further in this example, the derived competition rule may require that a criterium for selecting an event to be applied to a matchup is that the event must be an even-numbered matchup from a chronologically ordered set of events that otherwise meet the derived competition rules.

Any arrangement of matchups may be considered with the methods and systems of derived competition herein, such as single elimination, best of series, bracketed competition, and the like.

Referring to FIG. 1, in embodiments, a system for constructing and administering derived competitions 100 is depicted. The system 100 may include a set of video feeds 102 that may contain events for use in matchups for derived competition administration. The video feeds 102 may be accessible by an event detection system 104 that may include, among other things, the methods and systems for spatiotemporal pattern and event detection described in U.S. Pat. No. 10,460,177. The event detection system 104 may interface with a derived competition administration system 106 that may facilitate the administration of matchups and derived competitions as described herein. A set of derived competition rules 108 that may facilitate administration of the derived competition and event selection may be configured through an interface, such as user interface 112. In embodiments, the user interface may provide user access to sets of preconfigured, templated, and/or previously used derived competition rules (not shown) from which the set of derived competition rules 108 may be generated. An optional event directory/data set based on derived competition rules 110 may be utilized in embodiments to expedite access to events for matchups and the like. Administration of matchups and derived competition may be controlled and visualized through a derived competition user interface 114 through which participants, event types, and the like may be specified, and events and the like may be visualized. Optionally, the system 100 may further include a set of matchup and/or derived competition results 116, which may include video clips of the matchups, augmentations on the video clips, statistics, and the like.

Figure 2:
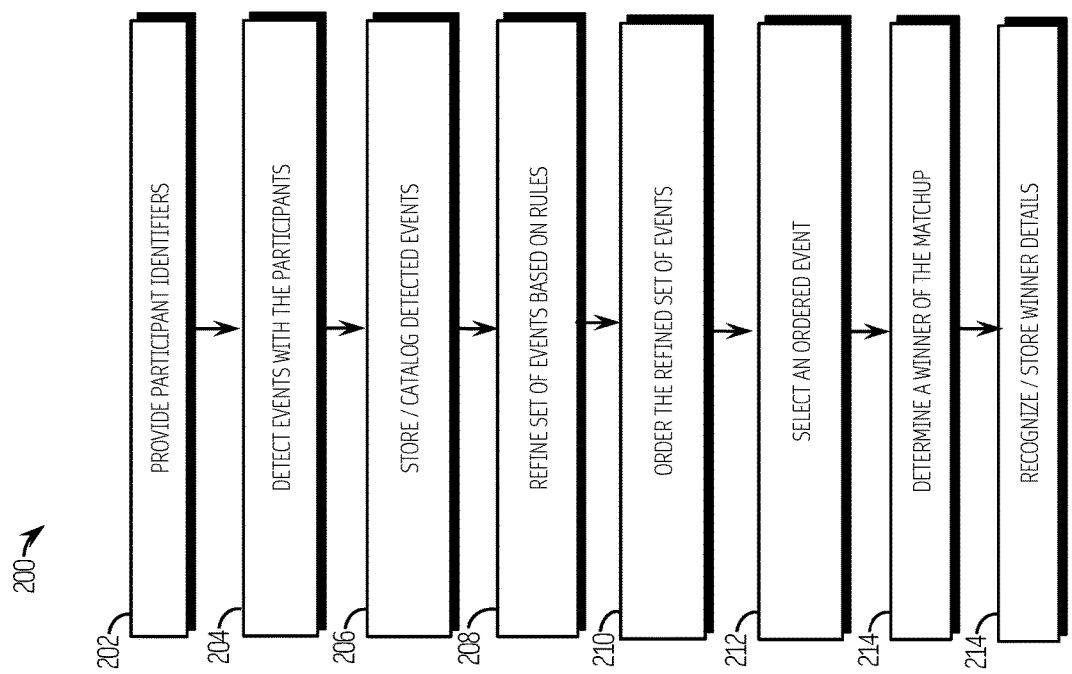
FIG. 2 illustrates an exemplary flow of an embodiment of a method of derived competition.

Referring to FIG. 2, in embodiments, a sequence of events for administering a derived competition may include starting with participant identifiers (e.g., a player name, jersey number, team, and the like). These identifiers may be provided to the event detection methods and systems described in U.S. Pat. No. 10,460,177 at step 202 that may process a set of video feeds of real-world competitions at step 204 that may include the participants (e.g., a set of video feeds for games in a professional basketball season) to detect events that depict the participants performing the event type of the derived competition (again for simplicity, we use a basketball dunk type event). The detected events may be stored or otherwise cataloged at step 206 with context that may be determined through the event detection process, methods and systems of which are again described in U.S. Pat. No. 10,460,177. Derived competition rules may be applied at step 208 to further refine the set of events (e.g., based on any criteria, such as date/time and the like) to a set that reflects the derived competition rules. In embodiments, the refined set of events may be ordered (e.g., chronologically) at step 210. A first event from the ordered set of events may be selected at step 212, again based at least in part on the derived competition rules that facilitate such selection. In embodiments, a winner of the first matchup may be determined at step 214 from an analysis of the corresponding event. One such embodiment may include the use of the event detection techniques of U.S. Pat. No. 10,460,177 to facilitate determining if the event is a successful dunk or a successful block. The identified winner may be recorded at step 216. In embodiments, the process steps 202 through 216 may be repeated for a new set of matchup participants, such as a winner of the first matchup and a different competitor. Generally, this approach does not require cataloging or storing separately from original video feeds large amounts of events of types that do not correspond to the derived competition or events of the proper type between participants not specified in a particular matchup. However, this approach may exhibit some processing delay between matchups while the potentially large set of video feeds are processed to detect events for the next matchup.

Figure 3:
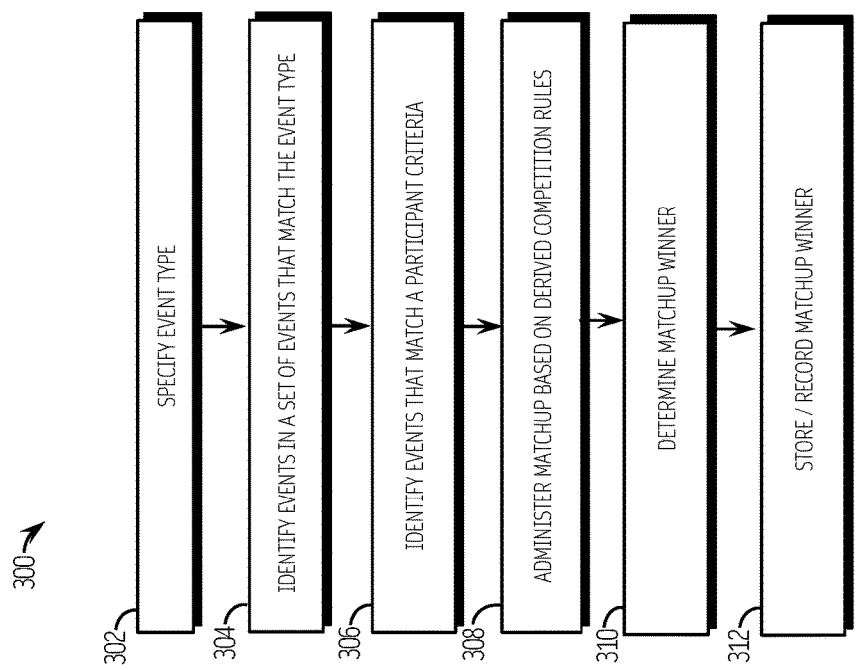
FIG. 3 illustrates an alternate exemplary flow of an embodiment of a method of derived competition.

In embodiments, another approach to administering a derived competition that is presented in FIG. 3 may exhibit less delay but may require increased preprocessing of the set of video feeds to configure one or more event directories and/or collections of events that may be indexed/selectable by type, outcome, participant, timeframe, and the like. An objective of such an indexable event data structure may be to facilitate indexing events based on any derived competition rule that impacts event selection. An event type may be specified or otherwise selected at step 302. The event type may be used to eliminate from further consideration events in the event data structure that do not comply with the event type at step 304. One or more participant identifiers may then be applied in step 306 to further reduce the set of events for consideration. A matchup occurrence may be administered by applying other derived competition rules at step 308, such as selecting a particular event based on date/time or other derived competition matchup rules. A result of the matchup as determined from the selected event may be determined in step 310 and stored in step 312. As noted above for the method of administering derived competitions in FIG. 2, the steps 302 through 312 may be repeated for a different combination of competitors and the like. In some embodiments, only a subset of the steps of the method 300 (such as steps of 306-312) may be repeated to identify different matchups and derived competitions.

As noted above, a derived competition may include a set of matchups. The participants in each matchup in such a set may not be predetermined but rather may be based on a result of each individual matchup. Therefore, administering a derived competition may be configured to operate independently of the selected participants, with those participants merely impacting event selection for a given matchup. Alternatively, the process may repeat between the two original participants, where a set of "matchup" events are used to process through a competition where a final winner is declared based on some criteria, such as amassing the most matchup wins during the competition.

Other considerations for administering a derived competition may include handling exceptions, such as if an event for a given matchup cannot be detected. This may occur when two participants have not been matched up in a real-world competition, or at least any such matchup is not available in the set of video feeds from which events are selected. The derived competition rules may be configured and/or default to an action when exceptions occur. One such action might include expanding the criteria for event selection, such as expanding the time frame to reach back further than a current or most recent professional basketball season and the like. In embodiments, exception handling may simply be part of the rule set for defining a derived competition. As an example, to handle the possibility that events of direct matchups between intended competitors do not always occur, transitive relationships could be used, e.g., if player A is beaten by player B who has been beaten by player C, then player A is considered to be beaten by player C.

As noted above, constructing a derived competition may involve designating how a winner of the competition is to be determined, which may be more or different from a single event matchup result. A criteria for determining a winner may include tallying how many times a given participant wins in the matchup events, with the participant amassing the most matchup wins being deemed the winner of the derived competition. In embodiments, a winner may be dependent on the outcomes of a sequence of matchups rather than a total number of wins.

In embodiments, the methods and systems described herein may analyze video feeds and/or derived competition data structures that include information descriptive of events of one or more video feeds to identify events that include one or more participants or matchup criteria that may be associated with a history of derived competitions (also referred hereinto as matchups) and tabulate data and/or determine statistics related to the matchups. The tabulated data and/or statistics may be used to identify and/or recommend aspects of matchups for further monitoring and/or tracking in video feeds. Tabulated data and/or statistics may be used to identify interesting matchups and/or derived competitions between participants. Interesting matchups may include matchups that are long-lived, competitive, dominated by one or more participants, popular, and the like. Recommendations of interesting matchups and/or derived competitions may be provided to a user along with related information, such as their tabulated data and/or statistics, that may be useful in locating events in the video feeds that include the matchups. In some cases, snippets or a video summary of the matchups may be provided for at least some of the recommended matchups allowing a user to do an evaluation of the recommended matchup. When a recommended matchup is selected by a user, or otherwise identified automatically (e.g., based on processing with a computer a derived competition rule and the like), video feeds, such as live video feeds, video feeds from a library of video feeds, or new video feeds meeting a matchup/derived competition selection criteria may be monitored for events related to the selected matchup, such as events that include one or more of the participants in at least one of the recommended matchups and/or that comply with one or more criteria derived from the tabulated data of the selected recommended matchup and the like. In response to detecting an event that may depict one or more participants and/or otherwise meet matchup criteria of the selected recommended matchup, additional actions may be executed with regard to the detected events, such as generating alerts for users, marking the event in the video feed (and/or building an index of candidate matchup events) with an indication of the event being a candidate matchup, compiling a video summary, and the like.

Analysis of video feeds and the like for derived competition/matchup event identification may be initiated by a user via one or more interfaces, such as by user interactions with a graphical user interface, specification entry via one or more files, queries, application programming interfaces, and the like. In some cases, analysis of video feeds may be automatically initiated in response to the availability of new video feeds, in response to a time trigger related to an analysis schedule, and the like. Analysis of video feeds may be based on matchup/derived competition analysis constraints. Matchup analysis constraints may include a specification of a time interval (for example, the analysis may include video feeds associated with events that occurred after, before, or between specified dates, specific tournaments, races, preseason games, etc.), categories of video feeds (copyright constraints, quality of video feed, resolution, etc.), participant affiliation (teams, leagues, etc.), categories of participants (age, gender, rookie status, height, etc.), type of events (dunks, one-on-one, penalty kicks, etc.), features of events (matchups that have a specific duration, number of participants in the matchup, etc.). Analysis constraints may be individually selected, or preconfigured configurations of analysis constraints may be curated by a user for specific sports, situations, tournaments, and the like.

Based at least in part on the analysis constraints, if any, a set of rules for detecting matchups in the video feeds may be determined. In some cases, rules for detecting matchups may include one or more trained machine learning models, pattern matching models, and the like. In some cases, each model may be trained to detect one aspect of an event or a type of event. In some cases, a model may be used to detect and classify video feeds into a plurality of event types and matchup types. In some cases (such as depending on the event type, type of model, and the like), a plurality of models may be executed sequentially on the video feeds. For example, one model may be used to identify video feed events of a general matchup type (such as a penalty kick) and may be used to identify all portions of a video feed that include penalty kicks, while another model may be used to identify (optionally only from the portions already identified as including penalty kicks) penalty kicks with specific features such as penalty kicks that hit the crossbar, left-footed penalty kickers, kicks occurring in the rain, kicks that enter the left/right half of the net, kicks that are blocked by the goalie (e.g., hand, head, body, foot), kicks where the goalie moves in the opposite direction of the kick, and the like. In embodiments, rules may be associated with data (such as with tags, metadata, and the like) that identifies the target of the rules (what the rules are configured to detect) such that the rules can be queried for use in the analysis as appropriate. When a video clip that matches one or more of the rules for detecting matchups is identified, data related to the matchup (e.g., the matching rule(s) and/or information of the relevant portion of the video clip) may be saved in a matchup database and/or associated with the portion of the video clip (optionally an event as described herein) that includes the detected matchup. In some cases, the data may include confidence that the portion of the video clip includes the specified matchup, such as the number of matchup rules that the analysis determines the video clip matches and the like.

Based at least in part on the analysis constraints, if any, a set of rules for detecting participants in the video feeds may be determined. Rules may include models for detecting the specified type of participant. For some participant constraints, models (such as training machine models) may be used to identify a particular type of participant. For example, for a constraint such as height, a trained model may be used to identify participant height based on a calibration using a known size of features in the video feed (goal posts, hoop height, etc.). In some cases, detection of participants according to the participant constraints may include identifying a list of participants and associated data based on the constraints. For example, participant constraints may be used to query a database of participants (such as player rosters, registered participants for events, etc.). The query may specify the constraints on the participants (such as age, team affiliation, hometown, etc.) to determine which participants match the constraints. The database data may provide identifiers that may be used to detect the participants in the video feeds. Identifiers may include jersey numbers, event numbers, uniform colors, names, photos of the participants, video of the participant, identifying characteristics (hair color, eye color, height, etc.) that may be used to identify the participants in the video feed. In some cases, the database data may include one or more models for identifying the participants in the video feed. Data related to the identified participants may be saved in a database and/or associated with the portion of the video clip in which the participant was detected. In some cases, the data may include confidence that the portion of the video clip includes the specified participant.

In embodiments, the video feeds may be analyzed to first identify the matchups according to the rules for detecting matchups, followed by identification of the participants in the subset of the video feeds that include the identified matchups. In some embodiments, the video feeds may be analyzed to first identify the participants according to the rules for detecting participants, followed by the identification of the matchups in the video feeds in the subset of the video feeds that include the identified participants. In some embodiments, the video feeds may be analyzed to identify portions that include the participants and the matchup according to their respective rules at the same analysis stage.

In some embodiments, the identified portions of the video clips that are identified with the respective matchup and participant rules may be further analyzed to identify features of the matchups. Features may include aspects of the matchup, features of the video clips, features of the participants, and the like. The features may be related to the analysis constraints or may be in addition to the analysis constraints. For example, the features may include aspects such as the duration of the matchup, the number of participants, the crowd reaction (such as noise), an amount of motion (number of pixel changes from frame to frame, a distance of movement of elements in the video, etc.), the like. Features in the matchup may be a factor in the scoring or weighting of each matchup. For example, matchups with more motion, louder crowds, a larger change in the noise of the crowds may have a larger weight than matchups with less motion or no change in crowd noise.

Data from the analysis (data related to participants, data related to matchups, data related to features, and the like) may be tabulated. The data may be analyzed to identify trends, statistics, matchup outcomes, and/or interesting matchups. For example, interesting matchups and/or derived competitions may include matchups that are long-lived. Long-lived matchups may include matchups between specific participants (e.g., opposing centers on a rival basketball teams), specific types of participants (designated hitters, final leg runners in relay races), participants that meet specific criteria (any two or more players on opposing select teams) in a long span of events, such as all events that matchup two specific participants through several competition seasons. Long-lived matchups may be characterized by a long consecutive span of a participant winning each matchup event or other outcome criteria that may be associated with a long span of a derived competition. The identification of long-lived matchups may be relative, such as being compared to the span of other matchups, and the top ten percent of matchups may be considered long-lived matchups. In some cases, the span of matchups may allow for one or two or a predefined threshold of losses from a participant and still be considered a long-lived winning span. In another example, interesting matchups may include competitive matchups. Competitive matchups may include matchups that are between two different participants (opposing or competing participants) wherein the matchups results in each of the opposing participants winning at least a threshold percent (such as 30 or 40 percent) of the matchups. In another example, interesting matchups may include frequent matchups. Frequent matchups may include matchups that include two or more of the same participants that are competing against each other with at least a threshold number of matchups between them. Matchups may be considered frequent if their frequency or total number is the top ten percent of the frequency or the total number of analyzed matchups. In another example, interesting matchups may include matchups in which a participant is a dominant participant such that the participant wins at least a threshold percentage of matchups (such as at least 70 percent or more).

In embodiments, identified matchups may be further scored according to one or more weighting associated with the participants, social media activity associated with a video clip that includes at least part of the matchup, and the like. For example, data regarding participants may be received from one or more sources and may relate to popularity of the participants, the salary of the participants, number of social media followers of the participants, changes (such as velocity or acceleration) of the number of social media followers of the participants, playing time, and the like and may be assigned a score based on the data. Participants with higher popularity, salary, number of social media followers, higher social media follower acceleration, playing time, and the like may be assigned a higher score than participants with lower data values. Matchups may be weighted according to the scores associated with the participants. In some cases, a matchup may be weighted according to the highest scoring participant, the average of the scores of the participants, the sum of the scores of the participants, and the like.

Interesting matchups may be identified to a user via one or more interfaces. A user may view interesting matchups and any scores associated with the matchups (such as the scores associated with weighting based on participant scores). An interface may present the matchups that are identified as interesting and may present a list of participants that are associated with the interesting matchups. Users may be provided with a video summary of all or some of the recommended matchups.

Interesting matchups from stored data feeds may be used to determine which matchups should be monitored or tracked in future data feeds. In many cases, characteristics of matchups and derived competitions that led to interesting matchups may also result in interesting matchups in future feeds. In some cases, users may select matchups that were identified as interesting in stored video feeds for monitoring in future feeds. Detection rules (such as machine learning models) that were used to detect matchups corresponding to interesting derived competitions and/or matchups may be used to detect new video feeds. When matchups are detected that match, the detection rules may result in an alert to a user and/or an automatic clip generation that includes the matchups and related derived competitions.

Figure 4:
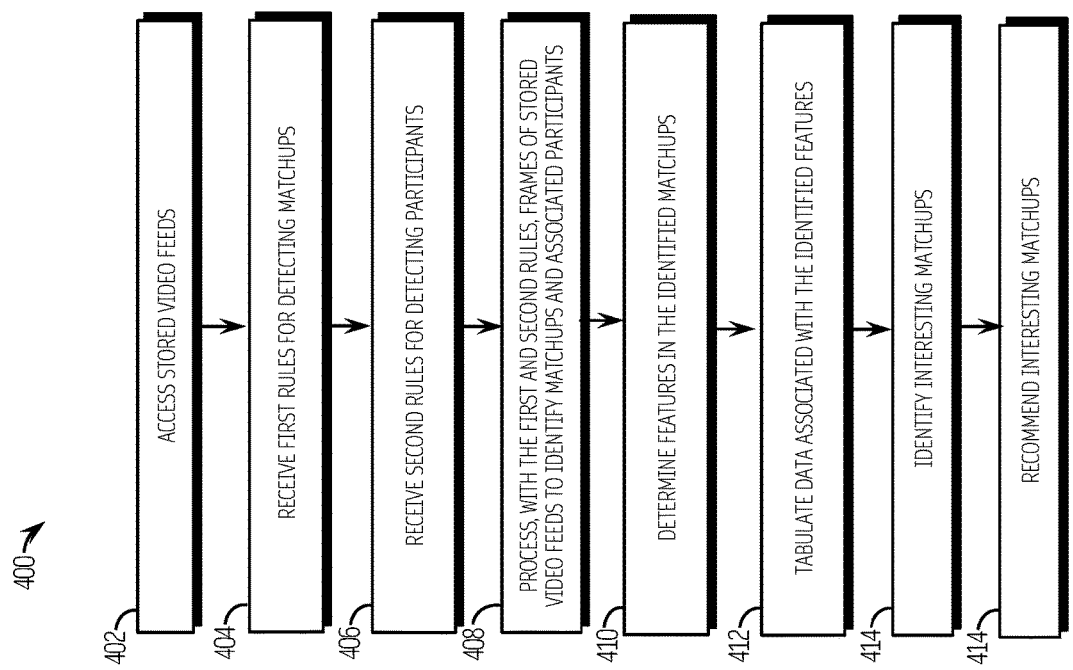
FIG. 4 illustrates an exemplary flow of an embodiment of a method of matchup prediction.

FIG. 4 illustrates an exemplary flow of an embodiment of a method of matchup prediction 400. The method may include accessing stored video feeds 402. The stored video feeds may be received from one or more local or remote sources. In some cases, the stored video may be filtered to only include video from specific tournaments, sporting events, dates, teams, countries, geographic locations, and the like. In embodiments of the method, the method may include receiving first rules for detecting matchups in the video feeds 404. The rules may be based on analysis constraints that specify aspects of matchups that should be detected. Based on the analysis constraints, appropriate rules may be determined or queried from a rules database. The method may further include receiving second rules for detecting participants 406. The second rule may be based on analysis constraints. The method may further include processing, with the first and second rules, frames of the stored video feed to identify matchups 408. The method may further include determining features in the identified matchups 410 and tabulating the data associated with the identified features 412. Based on the tabulation data, the method may further include identifying interesting matchups 414 that may be recommended 414 to a user for further monitoring 414.

In embodiments, tabulated data and statistics about matchups may be used to train models to predict if initial examples of matchups will lead to an interesting matchup in the future. The tabulated data may be used as labeled data to train a model to predict aspects of the next occurrence of a matchup. For example, based on some initial matchups for two or more competing participants, a model may be trained to determine the matchups between the participants will be long-lived, frequent, competitive, and the like.

Figure 5:
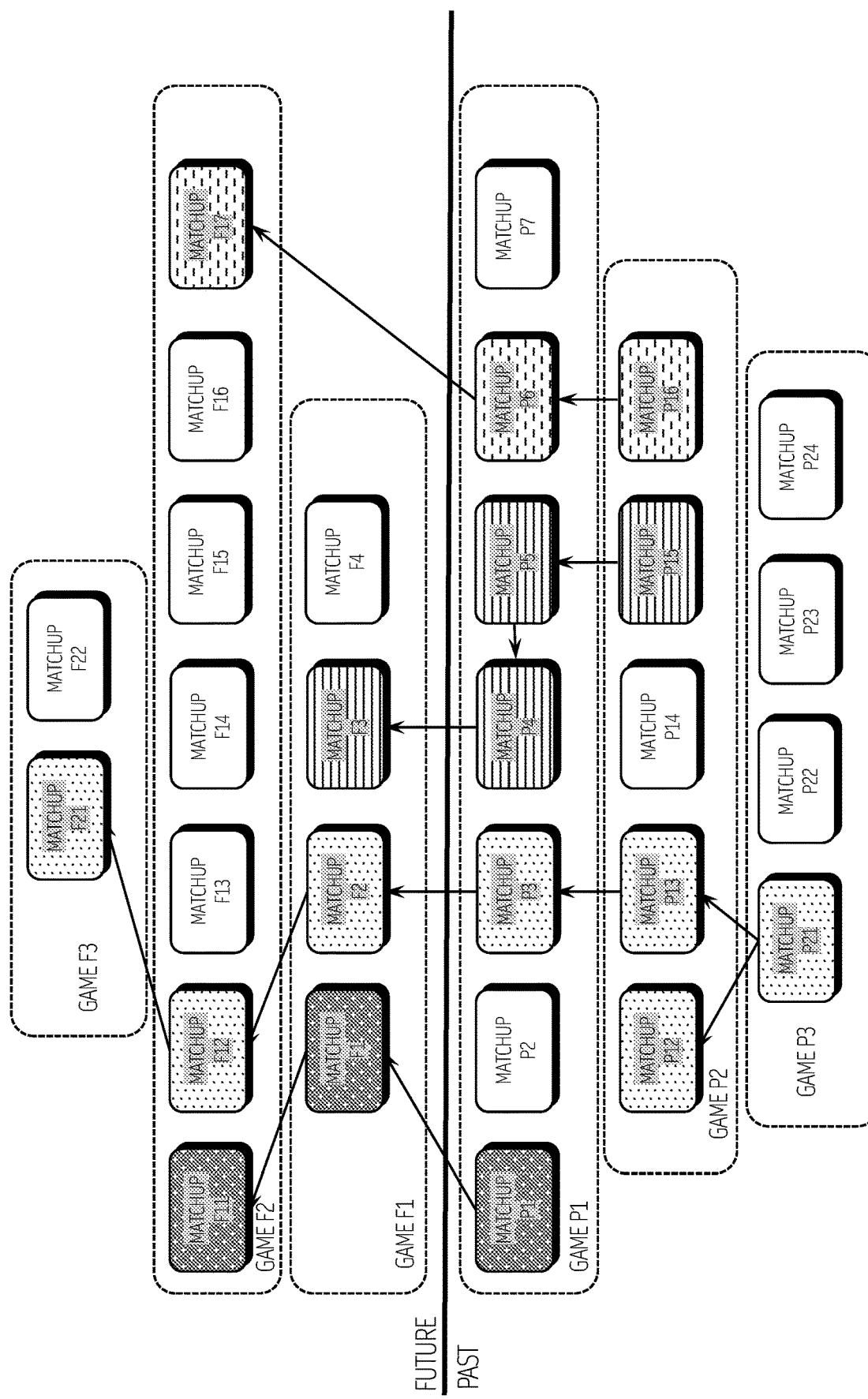
FIG. 5 illustrates example matchups and derived competitions in a series of games.

FIG. 5 illustrates example matchup and derived competitions in a series of games. FIG. 5 shows an example where matchups are identified in three sequential games (game p3, game p2, and game p1). The matchups in each game may be identified using rules for identifying matchups and/or identifying participants. The detected matchups include events and/or participants that match the detection rules. Using the detected matchups, derived competitions may be detected in the games and/or between games. Derived competition may be determined according to a temporal association of matchups that relate to at least one participant, event type, and the like. For example, in one example matchup P21 from game P3 may include the same participant and type of event at matchup P12 and matchup P13 in game P2. Likewise, the same participant from matchup P13 may also be a participant in matchup P3 from game P1. The combination of matchup P21, P12, P13, and P3 may comprise a derived competition with the same participant that competes against other participants in the same event. In another example, some matchups such as matchup P22 may be the only matchup with the particular participant and may not be related to any other matchups. In another example, matchups that create a derived competition may include matchups in the same game (for example, matchup p15, p5, and p4). The detected matchups may be analyzed to identify derived competitions. The derived competitions may be tabulated to determine the statistics of the derived competitions. For example, the longest-lived derived competition may be identified (matchup P21, P12, P13, P3). In some embodiments, the important matchups (such as the longest-lived) may be identified to a user. The characteristics of the matchups from interesting derived competitions may be used to select which matchups to track in future video clips (such as in games F1, F2, F3). In many cases, matchup characteristics that produce interesting derived competitions may produce interesting competitions in future games. Characteristics of matchups that resulted in interesting derived competitions may be used to determine which matchups should be tracked and/or detected in new video clips to determine interesting continuations of interesting derived competitions and new interesting derived competitions.

In embodiments, data from previous matchups and optionally participant and other statistics may be used to recommend potential matchups to track and emphasize for an upcoming competition such as a game, tournament, and the like. Prior to a competition, a list of potential matchups in the competition may be determined and analyzed to identify interesting matchups that may results in long-lived derived competitions as the competition progresses. In one example, prior to the start of a competition, rivalries between participants for one or more matchups may be highlighted to provide a prelude to the competition. For example, when applied to a tournament, a sequence of matchups that include a first player may end at any time as the tournament progresses if a team with the first player is knocked out (the first player, who may be a dominant player at a tournament may be on a losing team, and therefore that player's matchups for the tournament will end because the first player cannot be matched up further with players in the tournament). In embodiments, the system can attempt to predict the long-lived or feasible progression of matchups. In embodiments, the system may use external data about the likelihood of a team progressing such that when matchups are identified and tracked, they will likely progress through a tournament or into the post-season. The system may provide statistics to a user about the likelihood a matchup will extend into the post-season, tournament, or other competition. In embodiments, the system may evaluate the likelihood of each participant reaching the final of the competition based on team statistics, past performances, current standings, and the like. In embodiments, the system may identify a sequence of matchups that provide for the highest probability of progressing through the competition.

In embodiments, the system can find interesting matchups for "working backwards" from a selected participant and/or event type. A history of video clips may be analyzed to determine a historically derived competition that may lead to the selected event type and participant. For example, it may be interesting to show how one player became currently dominant at a type of event. The system may start from the current dominant player and work backward in time in video feeds of the player to find a sequence of events that represent winning matchups by the dominant player that cumulatively depict the player's dominance. The analysis of the video feeds may include identifying events, such as sequences of events that depict matchups in which the current dominant player overcame previously dominant players and how their status evolved to end up with the selected dominant player.

Figure 6:
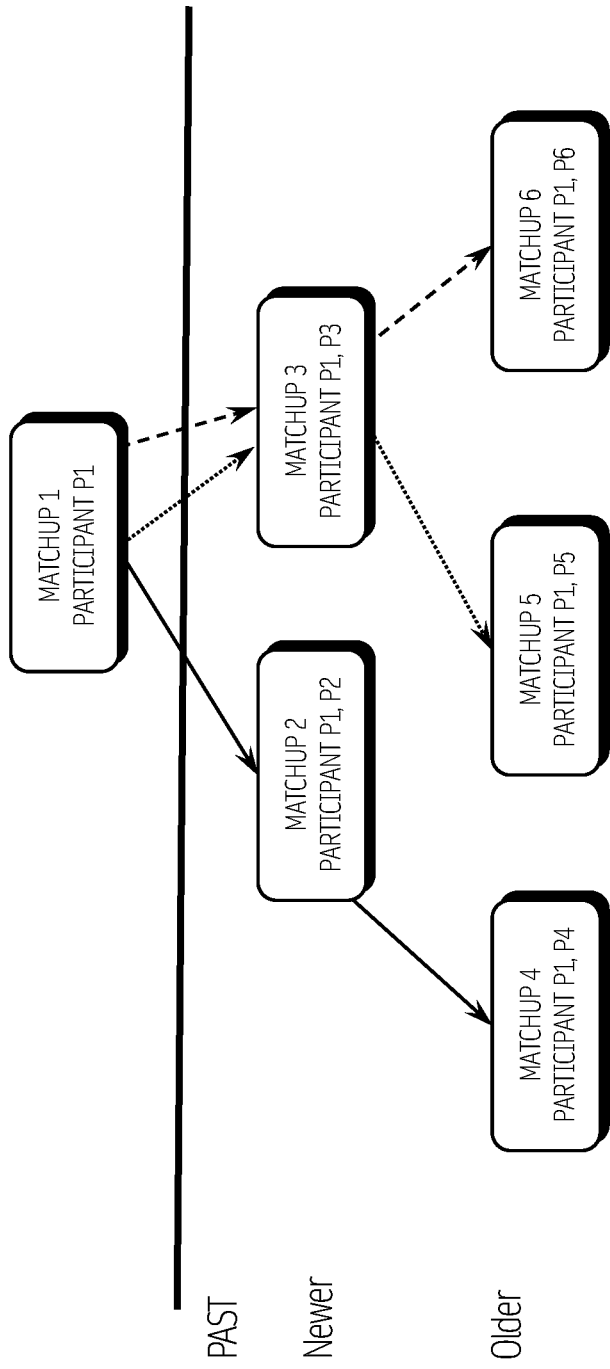
FIG. 6 illustrates example aspects of determining the history of matchups and derived competitions.

In some cases, more than one possible sequence of historical matchups may be derived from a selected matchup. For example, FIG. 6 shows one example of a selected matchup and participant (matchup 1, participant p1). A system may search for video clips that include the type matchup event consistent with matchup 1 and/or participant p1. In some cases, a tree of related matchups may be generated by examining a plurality of clips of corresponding matchup events. FIG. 6 shows an example of a tree of such matchup events that be used to create a derived competition that leads to the selected matchup/participant. Each path in the tree may be a possible derived competition that leads to the selected matchup/participant. In some cases, the links between the tree may be weighted according to the elements of the nodes in the trees and may be weighed according to the participants in each node, the date/time associated with the clip of the node, features in the clip of each node, and the like. A derived competition may be selected according to an accumulation of clip values (e.g., a link score) of clips in the link in each path. A path that maximizes the score may be selected for a derived competition. FIG. 6 shows one example where a derived competition determination/recommendation tree can result from three different paths that correspond to three different derived competitions that lead to the selected matchup based on the path through the tree.

In embodiments, external data sources may be used to identify interesting matchups and/or recommend matchups to track. Data from social media sites, news sites, and other sources may be analyzed to identify potentially interesting or popular matchups. In one embodiment, the system may monitor social media sites for video clips that may relate to a sporting event. The video clips may be analyzed to determine what participants are in the video clip and/or if the video clip corresponds to a matchup event. In one instance, the system may analyze one instance of a video clip and determine how often the video clip is shared, posted, discussed, commented on, and the like. When the video includes or references directly or indirectly (e.g., via hashtags and the like) identifiable matchups and/or participants, the system may use a measure of the popularity of the video clip in the determination of weights for the participants and/or the matchup event type for generating matchup recommendations. In some embodiments, identification of a matchup type or participants in a popular video clip may trigger the generation of matchup criteria (players, teams, locations, matchup type, and the like) that may be used for the analysis of other social media-indicated video clips to identify video clips that include other matchups related to the participants and/or matchup event type found in the popular clip. In some embodiments, identification of a matchup type or participants in a popular video clip may trigger the system to monitor new video clips for matchups related to the matchup and/or participants found in the popular video clip. In some cases, when a popular video clip is identified on social media, a video summary of the history of the matchups of the participants in the video clip may be automatically generated.

In embodiments, a matchup event may be defined, such as by matchup video analysis rules and the like as a specific type of spatiotemporal event in which two sets of participants (e.g., two opponents) are distinguishable (e.g., based on jersey color, rules of the game, relative positions (optionally included weighted and/or average positions) throughout the event) and in which a quantitative measure of outcome is determinable, such as achieving a game-specific outcome/ action (e.g., scoring a basket), and which has a defined end if the game-specific outcome is not achieved (e.g., missing a shot ends the event).

Detecting matchup events may be based on finding similar events (events classified as a specific type of event (drive to the basket, taking a shot)) that include the same participants. In embodiments, detecting matchup events may start with, for example, a participant identifier. The methods and systems of matchup event detection described herein may then find events with that participant identifier that are of a specific event type (e.g., events with a common measurable outcome). The analysis may then process further to look for at least one, but likely many matchup criteria, such as matchup aspects, rules, and data described herein, in the found events, such as a first participant taking a shot against second participants over a plurality of events. This may produce a set of candidate matchup events to select among for recommending to a user and the like.

Recommending a matchup may be based on detecting a number of matchup events as described above that occur over a timeframe (e.g., a season, a career, post-season games, etc.) for a specific participant (or alternatively that include a specific participant in sequential events so that a second matchup event must include at least one participant of a first matchup event) (or alternatively that include two specific participants). Alternatively, recommending a matchup might use other criteria to determine which of the patterns (e.g., found matchup events) to recommend based on other criteria, such as participant popularity, participant success at achieving the outcome independent of the opponent, a specifically identified participant, a rate of success of the outcome of the set of matchup events, and the like.

Although the systems and method described herein were described with respect to example sports and competitions, the methods and system are applicable to any sport or competition including, basketball, baseball, soccer, running, track and field, UFC or other one-on-one combat sports, car racing, bicycle racing, hockey, and bowling to name a few.

The methods and systems described herein may be deployed in part or in whole through a machine that executes computer software, program codes, and/or instructions on a processor. The processor may be part of a server, client, network infrastructure, mobile computing platform, stationary computing platform, or other computing platforms. A processor may be any kind of computational or processing device capable of executing program instructions, codes, binary instructions, and the like. The processor may be or include a signal processor, digital processor, embedded processor, microprocessor, or any variant such as a co-processor (math co-processor, graphic co-processor, communication co-processor, and the like) and the like that may directly or indirectly facilitate execution of program code or program instructions stored thereon. In addition, the processor may enable the execution of multiple programs, threads, and codes. The threads may be executed simultaneously to enhance the performance of the processor and to facilitate simultaneous operations of the application. By way of implementation, methods, program codes, program instructions, and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions, or other types of instructions capable of being executed by the computing or processing device may include but may not be limited to one or more of a CD-ROM, DVD, memory, hard disk, flash drive, RAM, ROM, cache, and the like.

A processor may include one or more cores that may enhance the speed and performance of a multiprocessor. In embodiments, the process may be a dual-core processor, quad-core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications networks. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein are not to be limited by the foregoing examples but is to be understood in the broadest sense allowable by law.

All documents referenced herein are hereby incorporated by reference in their entirety.

What is claimed is:

1. A method comprising:
    accessing a set of stored video feeds;
    receiving first rules for detecting matchups, wherein the first rules include spatiotemporal pattern algorithms that use a machine learning system to facilitate detecting a set of matchup events in the set of stored video feeds;
    receiving second rules for detecting participants in the set of stored video feeds;
    processing, with the first rules and the second rules, frames of the set of stored video feeds to identify at least one matchup event and at least one participant associated with each identified matchup event;
    determining, in the identified at least one matchup event, event features;
    tabulating the determined event features,
    receiving weighting for the participants; and
    determining ranking of the set of matchup events based on the weighting and the tabulation of the determined event features.

2. The method of claim 1, wherein tabulating further comprises determining a number of matchup events that includes a first participant and determining outcomes of the matchup events that include the first participant.

3. The method of claim 1, further comprising generating, based on the tabulated event features, a recommendation for monitoring video feeds for matchup events that include a first participant.

4. The method of claim 3, further comprising, receiving a selection for monitoring and analyzing a second set of video feeds for videos relating to one or more matchups that include the first participant.

5. The method of claim 4, further comprising:
generating an alert for a user in response to detecting the one or more matchups that include the first participant.

6. The method of claim 4, further comprising:
generating a video summary of the one or more matchups that include the first participant by extracting portions of video content from the set of stored video feeds.

7. The method of claim 1, wherein the first rules include a trained machine learning model.

8. The method of claim 1, wherein determining event features comprises determining at least one of: a type of event, a duration of the event, an outcome of the event, or a crowd reaction to the event.

9. The method of claim 1, further comprising:
determining categories of matchup events based on the tabulation.

10. The method of claim 1, wherein the second rules include rules for jersey number detection.

11. The method of claim 10, wherein the jersey number detection includes video frame by frame jersey number detection comprising classifying a plurality of windows in each frame as one of containing a number and as numberless.

12. The method of claim 11, wherein the classified plurality of windows in each frame containing the number are stitched together to form a temporal jersey number track.

* * * * *